United States Patent
Zhou et al.

(10) Patent No.: US 12,498,605 B2
(45) Date of Patent: Dec. 16, 2025

(54) DISPLAY MODULE AND DISPLAY APPARATUS

(71) Applicant: Wuhan China Star Optoelectronics Technology Co., Ltd., Hubei (CN)

(72) Inventors: Wei Zhou, Hubei (CN); Gege Zhou, Hubei (CN); Dong Tian, Hubei (CN); Yuyang Huang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 3 days.

(21) Appl. No.: 18/800,185

(22) Filed: Aug. 12, 2024

(65) Prior Publication Data
US 2024/0402542 A1    Dec. 5, 2024

Related U.S. Application Data (63) Continuation of application No. 17/765,012, filed as application No. PCT/CN2022/080563 on Mar. 14, 2022, now Pat. No. 12,092,928.

(30) Foreign Application Priority Data

Mar. 2, 2022    (CN) .......................... 202210199017.9

(51) Int. Cl.
    *G02F 1/1339*    (2006.01)
    *G02F 1/1335*    (2006.01)

(52) U.S. Cl.
    CPC ...... *G02F 1/1339* (2013.01); *G02F 1/133514* (2013.01)

(58) Field of Classification Search
    CPC ............. G02F 1/1339; G02F 1/133514; G02F 1/133512; G02F 1/133331; G09F 9/335; G09F 9/35; G09F 9/33; H10K 59/872
    See application file for complete search history.

(56) References Cited

U.S. PATENT DOCUMENTS

| | | |
|---|---|---|
| 11,086,157 B1 | 8/2021 | Zhou et al. |
| 2016/0067946 A1* | 3/2016 | Ma .......................... B32B 7/12 156/60 |

(Continued)

FOREIGN PATENT DOCUMENTS

| | | |
|---|---|---|
| CN | 204991003 | 1/2016 |
| CN | 110853522 | 2/2020 |

(Continued)

OTHER PUBLICATIONS

International Search Report and the Written Opinion Dated Nov. 30, 2022 From the International Searching Authority Re. Application No. PCT/CN2022/080563 and Its Translation Into English. (15 Pages).

(Continued)

*Primary Examiner* — Mariam Qureshi (57) ABSTRACT

Disclosed in the present disclosure is a display module and a display apparatus, wherein the orthographic projection region of the sealant on the display panel is located within the orthographic projection region of the second ink layer on the display panel, and the distance between the edge of the sealant and the edge of the second ink layer is greater than or equal to 0.1 mm, so as to prevent the small molecular oily organic substance precipitated from the sealant from diffusing to the surface of the first ink layer and improve the quality problems such as ungluing, dehiscing of the display module.

20 Claims, 5 Drawing Sheets

(56) References Cited

U.S. PATENT DOCUMENTS

2019/0071584 A1* 3/2019 Kim .......................... B32B 3/08
2019/0384095 A1* 12/2019 Chen ................. G02F 1/133512

FOREIGN PATENT DOCUMENTS

| | | |
|---|---|---|
| CN | 111128024 | 5/2020 |
| CN | 111766729 | 10/2020 |
| CN | 111965871 | 11/2020 |
| CN | 112987371 | 6/2021 |
| CN | 215599465 | 1/2022 |
| JP | 2006-259495 | 9/2006 |

OTHER PUBLICATIONS

Notification of Office Action and Search Report Dated May 18, 2023 From The State Intellectual Property Office of the People's Republic of China Re. Application No. 202210199017.9 and Its Translation Into English. (14 Pages).

Notification of Office Action Dated Dec. 11, 2023 From The State Intellectual Property Office of the People's Republic of China Re. Application No. 202210199017.9 and Its Translation Into English. (12 Pages).

* cited by examiner

DISPLAY MODULE AND DISPLAY APPARATUS

This application is a continuation of U.S. application Ser. No. 17/765,012, filed on Mar. 30, 2022 based upon International Application No. PCT/CN2022/080563, filed on Mar. 14, 2022, which claims priority to Chinese Patent Application Number 202210199017.9 filed on Mar. 2, 2022.

All of the afore-mentioned applications are hereby incorporated by reference in their entireties.

FIELD OF THE DISCLOSURE

The present disclosure relates to a display technology, and more specifically, to a display module and a display apparatus.

BACKGROUND

In conventional display modules, silicone adhesive is usually used for bonding between a panel body and a cover plate. Since silicone adhesive is easy to separated-out silicone oil will diffuse on a surface of main ink on the cover plate, therefore causing a dyne value on the surface of the main ink to exceed a standard value, further making occurrence of potential problems, such as ungluing, dehiscing of the display module.

SUMMARY

Technical Problem

The present disclosure provides a display module and a display apparatus, which aims at solving a problem that a surface dyne value of a first ink layer exceeds a standard value caused by small molecular oil-based organic substance separating from a sealant, which causes a display module to be prone to problems, such as ungluing, dehiscing.

Technical Solution

To attain the above objective, in a first aspect of the present disclosure, there is provided a display module. The display module with a display area and a non-display area surrounding the display area comprises a display panel, a cover plate, and a sealant.

The cover plate is disposed on the display panel. The cover plate comprises a first ink layer and a second ink layer located in the non-display area, wherein the second ink layer is formed at one side of the first ink layer close to the display panel. The sealant is located in the non-display area and formed between the display panel and the second ink layer. Furthermore, an orthographic projection region of the sealant on the display panel is located within an orthographic projection region of the second ink layer on the display panel, and a distance between an edge of the sealant and an edge of the second ink layer is greater than or equal to 0.1 mm.

Optionally, in some embodiments of the present disclosure, an interface expansion region ratio of the second ink layer is greater than an interface expansion region ratio of the first ink layer.

Optionally, in some embodiments of the present disclosure, the interface expansion region ratio of the second ink layer is greater than 0.1.

Optionally, in some embodiments of the present disclosure, a dyne value of the second ink layer is smaller than a dyne value of the first ink layer.

Optionally, in some embodiments of the present disclosure, the display panel comprises an array substrate and a color filter substrate disposed at one side of the array substrate close to the cover plate. Furthermore, the sealant is disposed between the array substrate and the second ink layer, and an orthographic projection region of the second ink layer on the array substrate is coupled to an orthographic projection region of the color filter substrate on the array substrate.

Optionally, in some embodiments of the present disclosure, the display module further comprises a backlight module disposed on one side of the display panel away from the cover plate. Furthermore, an orthographic projection region of a boundary of the second ink layer away from the display area on the backlight module coincides with a boundary of the backlight module.

Optionally, in some embodiments of the present disclosure, the sealant comprises a first sealant and a second sealant arranged at intervals in a first direction, and wherein the display panel further comprises a driving chip located between the first sealant and the second sealant and located in the non-display area. The second ink layer comprises a first sub-ink layer and a second sub-ink layer.

Furthermore, an orthographic projection region of the first sealant on the display panel is located within an orthographic projection region of the first sub-ink layer on the display panel, and a distance between an edge of the first sealant and an edge of the first sub-ink layer is greater than or equal to 0.1 mm. An orthographic projection region of the second sealant on the display panel is located within an orthographic projection region of the second sub-ink layer on the display panel, and a distance between an edge of the second sealant and an edge of the second sub-ink layer is greater than or equal to 0.1 mm.

Optionally, in some embodiments of the present disclosure, the non-display area comprises a first non-display area extending in a first direction and a second non-display area connected to the first non-display area and extending in a second direction and, wherein the first direction intersects the second direction.

Furthermore, the sealant is located in the first non-display area, and the second ink layer comprises a main body portion located in the first non-display area and an extension portion connected to the main body portion and disposed in the second non-display area, wherein the orthographic projection region of the sealant on the second ink layer is located within a boundary of the main body portion of the second ink layer.

Optionally, in some embodiments of the present disclosure, a width of the extension portion gradually decreases in a direction which is away from the first non-display area.

Optionally, in some embodiments of the present disclosure, the thickness of the second ink layer is greater than or equal to 4 mm and less than or equal to 10 mm.

Optionally, in some embodiments of the present disclosure, the sealant comprises silicone adhesive.

Optionally, in some embodiments of the present disclosure, the dyne value of the second ink layer is less than 28 N/m.

In a second aspect of the present disclosure, there is provided a display apparatus comprising any of the above-mentioned display modules.

Advantages of the Present Disclosure

Compared with the prior art, a display module and a display apparatus are provided according to the embodiments of the present disclosure. Since the second ink layer is disposed between the first ink layer and the sealant and located in the non-display area, and the orthographic projection region of the sealant on the display panel is located within the orthographic projection region of the second ink layer on the display panel, and the distance between the edge of the sealant and the edge of the second ink layer is greater than or equal to 0.1 mm, small molecular oil-based organic substance separated from the sealant in the non-display area are prevented from diffusing to the surface of the first ink layer in the non-display area of the cover plate, thereby reducing the probability that the dyne value on the surface of the first ink layer exceeds the standard value, and improving the quality problems such as ungluing, dehiscing, and so on of the display module.

DETAILED DESCRIPTION

In order to make the objectives, technical solutions and technical effects of the present disclosure clearer, the present disclosure will be further described in detail hereafter with reference to the accompanying drawings and examples. It should be understood that the specific embodiments described herein are simply used to explain the present disclosure, but not to limit the present disclosure.

Figure 1A:
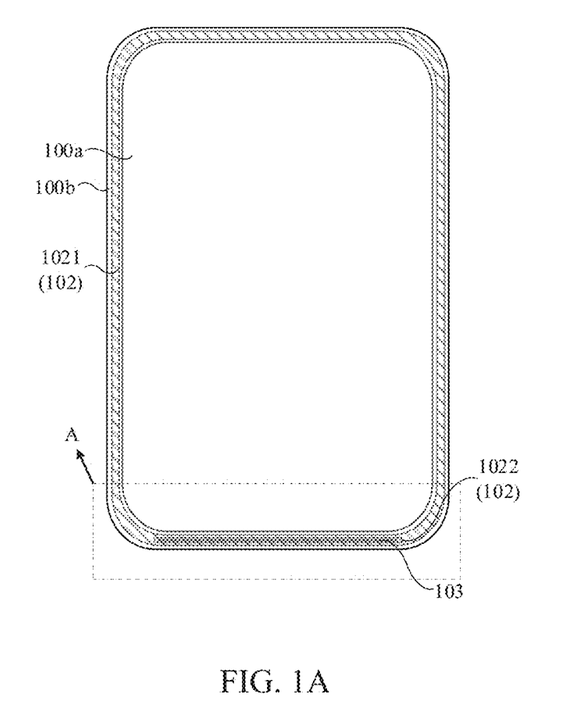
FIG. 1A to FIG. 1B are structural schematic diagrams of a display module provided by an embodiment of the present disclosure.
Figure 1B:
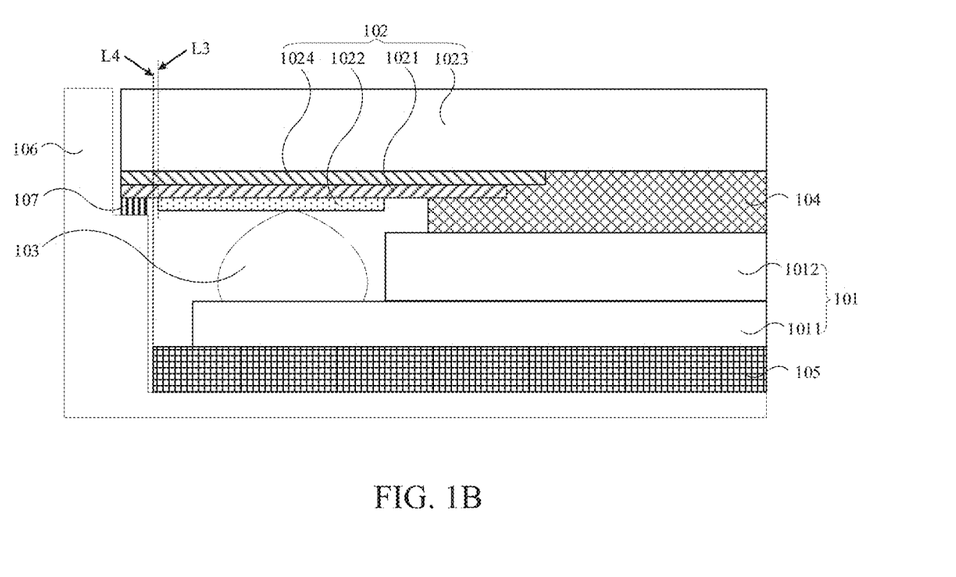

Specifically, FIG. 1A to FIG. 1B are schematic structural diagrams of a display module provided by an embodiment of the present disclosure. The display module comprises a display area 100a and a non-display area 100b surrounding the display area 100a. The display module implements a display function in the display area 100a. Optionally, the display module implements sensing functions such as imaging, touch, distance, and temperature in at least one of the display area 100a or the non-display area 100b.

Optionally, the display module comprises a liquid crystal display module, an organic light emitting diode display module, a miniature diode display module, a sub-millimeter diode display module, a quantum dot display module, and so on.

The display module comprises a display panel 101, a cover plate 102, and a sealant 103.

The cover plate 102 is disposed on the display panel 101. The cover plate 102 comprises a first ink layer 1021 and a second ink layer 1022 disposed in the non-display area 100b, wherein the second ink layer 1022 is formed at one side of the first ink layer 1021 close to the display panel 101. The sealant 103 is disposed in the non-display area 100b and located between the display panel 101 and the second ink layer 1022. The sealant 103 may precipitate small molecular oil-based organic substance.

Furthermore, the sealant 103 includes silicone adhesive. A primary component of the silicone adhesive is trimethoxy-terminated polydimethylsiloxane, which forms a chemically stable siloxane polymer after curing, a chemical reaction formula is as follows:

Low molecular weight siloxanes (D3-D10) are mixed into high polymer macromolecules. Since the high polymer macromolecules have strong volatility, they will volatilize and sublimate during and after curing of a silica gel and adhere to the surface of the first ink layer 1021. Since methyl group at an end of a chain of the high polymer macromolecules have hydrophobic properties, surface conditions (for example, surface energy is reduced, that is, the dyne value is reduced) of the first ink layer 1021 will be changed.

Therefore, in order to prevent small molecular oil-based organic substance separated from the sealant 103 from contaminating the surface of the first ink layer 1021, and causing the dyne value of the surface of the first ink layer 1021 to exceed the standard value, an orthographic projection region of the sealant 103 on the display panel 101 is located within an orthographic projection region of the second ink layer 1022 on the display panel 101, thereby resulting in potential problems such as ungluing, dehiscing of the display module.

Furthermore, as an orthographic projection region of the sealant 103 on the second ink layer 1022 is located within the second ink layer 1022, and if a distance between an edge of the sealant 103 and an edge of the second ink layer 1022 is too small, there is a possibility that the small molecular oil-based organic substance separated from the sealant 103 will diffuse to the surface of the first ink layer 1021, accordingly causing the surface dyne value of the first ink layer 1021 to exceed the standard value. Therefore, in order to prevent the small molecular oily substances separated from the sealant 103 from diffusing to the surface of the first ink layer 1021 after the second ink layer 1022 is provided, the orthographic projection region of the sealant 103 on the display panel 101 is required to be located within the orthographic projection region of the second ink layer 1022 on the display panel 101, and a distance between the edge L1 of the sealant 103 and an edge L2 of the second ink layer 1022 is greater than or equal to 0.1 mm, so as to further reduce a probability of the small molecular oil-based organic substance separated from the sealant 103 diffusing to the surface of the first ink layer 1021.

Compared with the first ink layer 1021, the second ink layer 1022 needs to be more unfavorable for diffusion of small molecular oil-based organic substance separated from the sealant 103. Therefore, the dyne value of the second ink layer 1022 is smaller than the dyne value of the first ink layer 1021.

Optionally, the dyne value of the first ink layer 1021 is less than 32 N/m, and the dyne value of the second ink layer 1022 is less than 28 N/m.

In addition, an interface expansion region ratio Sdr may also be used to represent characteristic that the second ink layer 1022 is more unfavorable for the diffusion of small molecular oil-based organic substance separated from the sealant 103 relative to the first ink layer 1021. Specifically, the interface expansion region ratio Sdr of the second ink layer 1022 is greater than the interface expansion region ratio Sdr of the first ink layer 1021.

Furthermore, the inventors of the present disclosure have found through experiments that when the interface expansion region ratio Sdr of the second ink layer 1022 is greater than 0.1, since the surface area of the second ink layer 1022 is larger than a surface area of the first ink layer 1021, diffusion path of the small molecular oil-based organic substance separated from the sealant 103 on the second ink layer 1022 becomes farther, which is more unfavorable for the small molecular oil-based organic substance separated from the sealant 103 to diffuse, so that it may effectively prevent all small molecular oil-based organic substance separated from the sealant 103 from diffusing to the surface of the first ink layer 1021, thereby improving the problems such as ungluing and dehiscing of the display module.

Please continue to refer to FIGS. 1A-1B, the display module further includes optical adhesive 104 disposed between the cover plate 102 and the display panel 101.

Wherein there is a gap between the orthographic projection region of the sealant 103 on the display panel 101 and an orthographic projection region of the optical adhesive 104 on the display panel 101, namely, the orthographic projection region of the sealant 103 on the display panel 101 does not intersect with the orthographic projection region of the optical adhesive 104 on the display panel 101, so as to prevent the small molecular oil-based organic substance separated from the sealant 103 from diffusing into the optical adhesive 104, and causing the display module to have quality problems such as ungluing and dehiscing in the display area 100a, and affecting the display function of the display panel 101.

Optionally, the first ink layer 1021 is connected to the optical adhesive 104 to avoid problems such as light leakage in the display module.

Since the orthographic projection region of the sealant 103 on the display panel 101 does not interest the orthographic projection region of the optical adhesive 104 on the display panel 101, and the small molecular oil-based organic substance separated from the sealant 103 caused by an existence of the second ink layer 1022 does not diffuse on the surface of the first ink layer 1021, therefore, it may prevent the small molecular oil-based organic substance separated from the sealant 103 from diffusing into the optical adhesive 104 through the first ink layer 1021, further improving the problems such as ungluing and dehiscing of the display module. At a same time, it may also prevent the small molecule oil-based organic substance separated from the sealant 103 from diffusing into the display panel 101 through the optical adhesive 104 and affecting the display performance of the display panel.

Please continue to refer to FIGS. 1A-1B, the display panel 101 includes an array substrate 1011. The array substrate 1011 includes a substrate, an active layer formed on the substrate, a first gate insulating layer (GI1) formed on the active layer, a first gate layer (GE1) formed on one side of the first gate insulating layer (GI1) away from the active layer, an interlayer dielectric layer (ILD) formed on the first gate layer (GE1), a first source/drain layer (SD1) on the interlayer dielectric layer (ILD), and a passivation layer (PV) formed on the first source/drain layer (SD1) and a first planarization layer (PLN1). Wherein the first gate layer (GE1) includes a gate line and a gate disposed opposing to the active layer, and the first source/drain layer (SD1) comprises a source/drain line and a source electrode and a drain electrode electrically connected to the active layer.

Optionally, the array substrate 1011 further includes a second gate insulating layer (GI2) formed on the first gate layer (GE1), and a second gate layer formed on one side of the second gate insulating layer (GI2) away from the first gate layer (GE1). The interlayer dielectric layer (ILD) is formed between the second gate layer (GE2) and the first source/drain layer (SD1). Optionally, the array substrate 1011 further includes a second source/drain layer (SD2) formed on the first planarization layer (PLN1) and a second planarization layer (PLN2) formed on the second source/drain layer (SD2).

The array substrate 1011 includes a bonding region, and the bonding region is disposed in the non-display area 100b. The array substrate 1011 includes a plurality of bonding terminals disposed in the bonding region, and the sealant 103 may be in the bonding region and disposed on a plurality of the bonding terminals.

Optionally, the bonding region is located within a lower border area of the display module. The display module further includes a drive module. The drive module includes a flexible circuit board and a printed circuit board, the flexible circuit board includes a first end and a second end opposite to each other, wherein the first end is electrically connected to the bonding terminals, the second end is electrically connected to the printed circuit board, so as to form an electrical connection between the display panel 101 and the printed circuit board. Optionally, the flexible circuit board includes a chip on film.

If the display module is a liquid crystal display module, the array substrate 1011 further includes pixel electrodes, alignment layers, polarizers, liquid crystal molecules and other parts not shown.

Please continue to refer to FIGS. 1A to 1B, taking the display module as a liquid crystal display module as an example, the display module further includes a color filter substrate 1012, and the color filter substrate 1012 is disposed on one side of the array substrate 1011 close to the cover plate 102. Wherein the sealant 103 is disposed in the bonding region of the array substrate 1011 and formed between the array substrate 1011 and the second ink layer 1022. An orthographic projection region of the second ink layer 1022 on the array substrate 1011 intersects an orthographic projection region of the color filter substrate 1012 on the array substrate 1011, so as to ensure that a certain gap between the orthographic projection region of the sealant 103 on the display panel 101 and the orthographic projection region of the optical adhesive 104 on the display panel 101, thereby preventing the small molecular oil-based organic substance separated from the sealant 103 from diffusing to the surface of the first ink layer 1021, and preventing the small molecular oil-based organic substance separated from the sealant 103 from diffusing into the optical adhesive 104 through the first ink layer 1021 by using the second ink layer 1022, further preventing the small molecule oil-based organic substance separated from the sealant 103 from diffusing into the display panel 101 through the optical adhesive 104 and affecting the display performance of the display panel 101.

Furthermore, the display module further includes a backlight module 105 and a middle frame 106. The backlight module 105 is disposed on one side of the display panel 101 away from the cover plate 102, and the middle frame 106 includes a groove on which the display panel 101 and the backlight module 105 are disposed, and a step portion on which the cover plate 102 is partially disposed. The cover plate 102 and the middle frame 106 are adhered to each other by an adhesive 107. Wherein an orthographic projection region of the sealant 103 on the backlight module 105 is located within the backlight module 105, so as to prevent the small molecular oil-based organic substance separated from the sealant 103 from diffusing into the adhesive 107 and causing the problems such as ungluing and dehiscing of the display module to occur.

Specifically, an orthographic projection region of boundary L3 of the second ink layer 1022 away from the display area 100*a* on the backlight module 105 is spaced apart from a boundary L4 of the backlight module 105 away from the display area 100*a*, or the orthographic projection region of the boundary L3 of the second ink layer 1022 away from the display area 100*a* on the backlight module 105 coincides with the boundary L4 of the backlight module 105 away from the display area 100*a*, so that there is a gap between the second ink layer 1022 and the adhesive 107, thereby preventing the small molecular oil-based organic substance separated from the sealant 103 from diffusing into the adhesive 107 through the second ink layer 1022 or the first ink layer 1021, and further improving the problems such as ungluing and dehiscing of the display module.

Please refer to FIGS. 2A to 2D, which are partial enlarged views of region A in the display module shown in FIG. 1A. The display module further includes a driving chip integrated circuit (IC), and the driving chip IC may be integrated in the drive module (not shown in the figure) or disposed on the display panel 101.

Figure 2A:
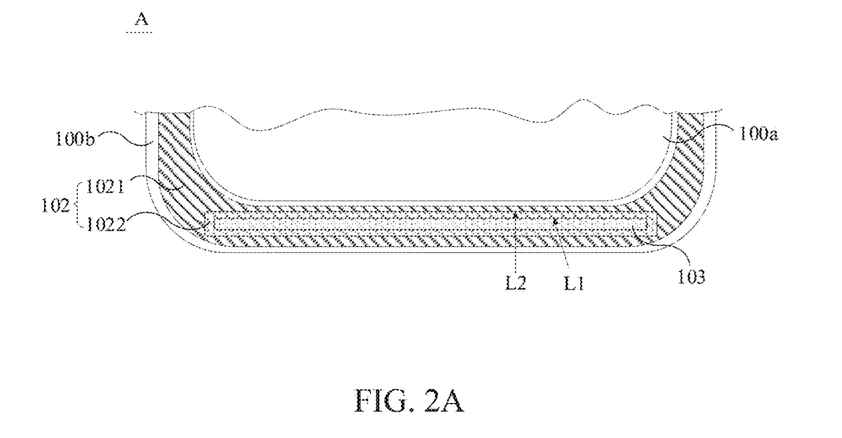
FIG. 2A to FIG. 2D are partial enlarged views of region A in the display module shown in FIG. 1A.

Specifically, please continue to refer to FIG. 2A, in a case that the driving chip IC is integrated into the drive module, it may be bonded to the bonding region in the form of a chip on film. At this time, the sealant 103 is disposed in the bonding region and the second ink layer 1022 is correspondingly disposed in the bonding region, and an orthographic projection region of the sealant 103 on the array substrate 1011 is located within an orthographic projection region of the second ink layer 1022 on the array substance 1011 and the distance between the edge L1 of the sealant 103 and the edge L2 of the second ink layer 1022 is greater than or equal to 0.1 mm.

Figure 2B:
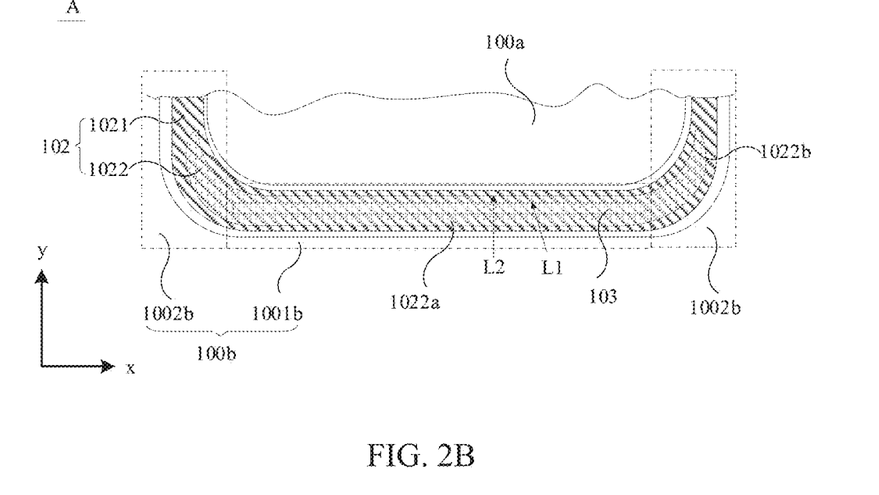

Please continue to refer to FIG. 2B, the driving chip IC is still bonded to the bonding region in the form of a chip on film, and the non-display area 100*b* includes a first non-display area 1001*b* extending in a first direction x and a second non-display area 1002*b* extending in a second direction y and coupled to the first non-display area 1001*b*, wherein the first direction x intersects the second direction y. Wherein the sealant 103 is disposed in the first non-display area 1001*b*, and the second ink layer 1022 includes a main body portion 1022*a* disposed in the first non-display area 1001*b* and an extension portion 1022*b* disposed in the second non-display area 1002*b* and coupled to the main body portion 1022*a*. An orthographic projection region of the sealant 103 on the second ink layer 1022 is located within a boundary of the main body portion 1022*a*. Furthermore, a distance between the edge L1 of the sealant 103 and the edge of the main body portion 1022*a* of the second ink layer 1022 is greater than or equal to 0.1 mm.

By making the second ink layer 1022 include the main body portion 1022*a* and the extension portion 1022*b*, and the orthographic projection region of the sealant 103 on the second ink layer 1022 is located within the boundary of the main body portion 1022*a*, a coverage area of the second ink layer 1022 increases, so that the small molecule oil-based organic substance separated from the sealant 103 are prevented from diffusing to the surface of the first ink layer 1021 located within the second non-display area 1002*b*, thereby preventing the small molecular oil-based organic substance separated from the sealant 103 from affecting the adhesive properties of the joint of the first non-display area 1001*b* and the second non-display area 1002*b*, and further preventing the display module from the potential problems such as ungluing and dehiscing occurring at a junction of the first non-display area 1001*b* and the second non-display area 1002*b*.

Optionally, the first non-display area 1001*b* and the bonding region are a same area. Optionally, the display panel may include a plurality of bonding regions, and at least one of the plurality of bonding regions and the first non-display region 1001*b* are a same area.

Furthermore, as the sealant 103 is only disposed in the first non-display area 1001*b*, and in order to increase the coverage area of the second ink layer 1022 and to reduce production cost and adapt to an arc transition design adopted at four corners of the display module, a width of the extension portion 1022*b* gradually decreases in a direction away from the first non-display area 1001*b*.

Figure 2C:
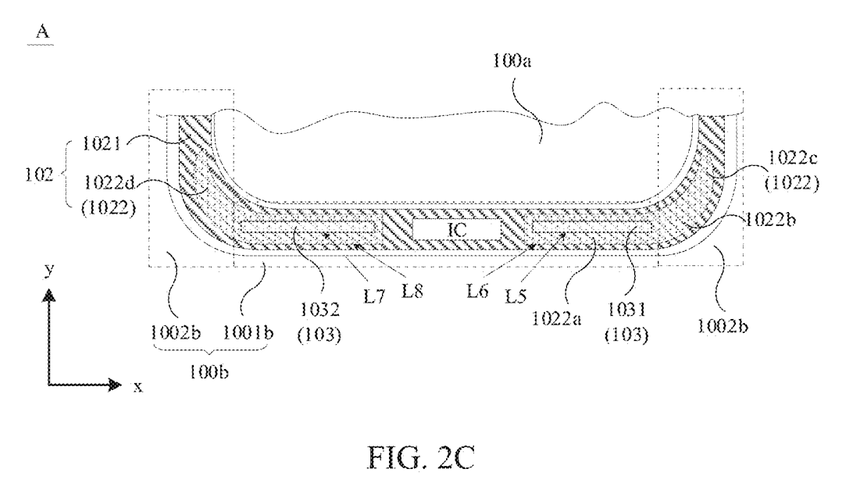
Figure 2D:
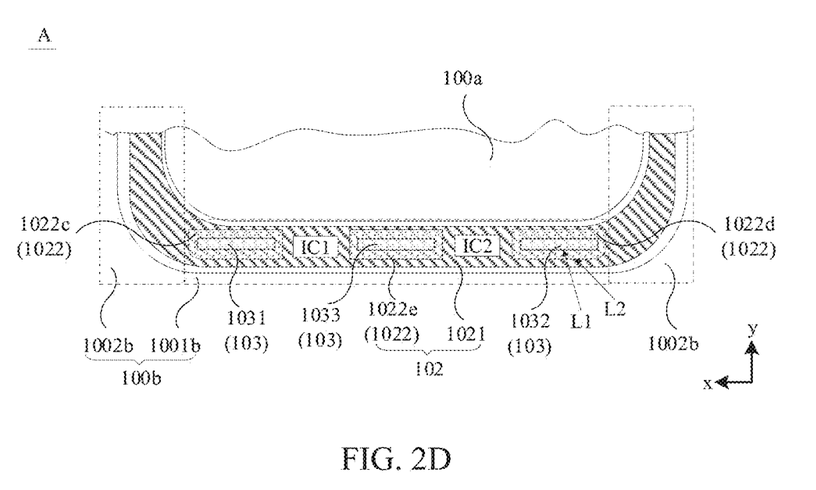

Please continue to refer to FIG. 2C to FIG. 2D, the driving chip IC may also be disposed in the non-display area 100*b*. In order to prevent the small molecular oil-based organic substance separated from the sealant 103 from affecting the performance of the driving chip IC, the orthographic projection region of the sealant 103 on the array substrate 1011 does not intersect an orthographic projection region of the driving chip IC on the array substrate 1011.

Furthermore, since the orthographic projection region of the sealant 103 on the array substrate 1011 does not intersect the orthographic projection region of the driving chip IC on the array substrate 1011, and in order to save costs and prevent the small molecular oil-based organic substance separated from the sealant 103 through the second ink layer 1022 from affecting the performance of the driving chip IC, the orthographic projection region of the second ink layer 1022 on the array substrate 1011 does not intersect the orthographic projection region of the driving chip IC on the array substrate.

Specifically, the sealant 103 includes a first sealant 1031 and a second sealant 1032 arranged at intervals in the first direction x, and the driving chip IC is disposed in the non-display area 100*b* and located between the first sealant 1031 and the second sealant 1032. The second ink layer 1022 includes a first sub-ink layer 1022*c* and a second sub-ink layer 1022*d*. Wherein the orthographic projection region of the first sealant 1031 on the display panel 101 is located within the orthographic projection region of a first sub-ink layer 1022*c* on the display panel 101, and a distance between an edge L5 of the first sealant 1031 and an edge L6 of the first sub-ink layer 1022*c* is greater than or equal to 0.1 mm. An orthographic projection region of the second sealant 1032 on the display panel 101 is located within an orthographic projection region of the second sub-ink layer 1022*d* on the display panel 101, and the distance between the edge L7 of the second sealant 1032 and the edge L8 of the second sub-ink layer 1022*d* is greater than or equal to 0.1 mm, so as to prevent the small molecular oil-based organic substance separated from the first sealant 1031 from diffusing to the surface of the first ink layer 1021 by utilizing the first sub-ink layer 1022*c*, and prevent the small molecular oil-based organic substance separated from the second sealant 1032 from diffusing to the surface of the first ink layer 1021 by utilizing the second sub-ink layer 1022*d*, and prevent the small molecular oil-based organic substance separated from the first sealant 1031 and the second sealant 1032 from diffusing to the driving chip IC and affecting the performance of the driving chip.

Furthermore, the driving chip is disposed in the first non-display area 1001*b*, and the first sub-ink layer 1022*c* and the second sub-ink layer 1022*d* both include the main body portion 1022*a* and the extension portion 1022*b*, so as to increase the coverage area of the second ink layer 1022 and prevent the small molecular oil-based organic substance separated from the first sub-ink layer 1022*c* and the second sub-ink layer 1022*d* from diffusing to the surface of the first ink layer, further preventing the display module from the potential problems such as ungluing and dehiscing occurring at the junction of the first non-display area 1001*b* and the second non-display area 1002*b*.

Optionally, the driving chip IC, the first sealant 1031 and the second sealant 1032 are all located within the first non-display area 1001*b*.

Optionally, the display module may include a plurality of the driving chip ICs, and the plurality of the driving chip ICs are all disposed in the non-display area 100*b*. Wherein both ends of at least part of the driving chip ICs are provided with the sealant 103, and the second ink layer 1022 are disposed corresponding to the sealant 103, and the distance between the edge L1 of the sealant 103 and the edge L2 of the second ink layer 1022 is greater than or equal to 0.1 mm.

Specifically, please continue to refer to FIG. 2D, the display module includes a first driving chip IC1 and a second driving chip IC2. The sealant 103 includes the first sealant 1031, the second sealant 1032, and the third sealant 1033 arranged at intervals in the first direction x. The first driving chip IC1 and the second driving chip IC2 are disposed in the non-display area 100*b* and located within the first sealant 1031 and the second sealant 1032. The third sealant 1033 is disposed between the first driving chip IC1 and the second driving chip IC2. The second ink layer 1022 includes the first sub-ink layer 1022*c*, the second sub-ink layer 1022*d*, and a third sub-ink layer 1022*e*.

Wherein the orthographic projection region of the first sealant 1031 on the display panel 101 is located within an orthographic projection region of the first sub-ink layer 1022*c* on the display panel 101, and a distance between an edge of the first sealant 1031 and an edge of the first sub-ink layer 1022*c* is greater than or equal to 0.1 mm. The orthographic projection region of the second sealant 1032 on the display panel 101 is located within the orthographic projection region of the second sub-ink layer 1022*d* on the display panel of 101, and a distance between an edge of the second sealant 1032 and an edge of the second sub-ink layer 1022*d* is greater than or equal to 0.1 mm. An orthographic projection region of the third sealant 1033 on the display panel of 101 is located within the orthographic projection region of the third sub-ink layer 1022*e* on the display panel 101, and a distance between an edge of the third sealant 1033 and an edge of the third sub-ink layer 1022*e* is greater than or equal to 0.1 mm.

Optionally, the first sub-ink layer 1022*c* and the second sub-ink layer 1022*d* close to the junction of the first non-display area 1001*b* and the second non-display area 1002*b* may be designed in a circular-arc shape, so as to adapt to the arc transition design adopted at the four corners of the display module.

Optionally, please continue to refer to FIGS. 1A-1B, the area of the first ink layer 1021 in the non-display area 100*b* is larger than the area of the second ink layer 1022 in the non-display area 100*b*. The cover plate 102 further includes a base substrate 1023 and a third ink layer 1024. The third ink layer 1024 is disposed on one side of the first ink layer 1021 away from the second ink layer 1022. The first ink layer 1021, the second ink layer 1022 and the third ink layer 1024 are prepared on the base substrate 1023, and shading performance is improved by arranging the first ink layer 1021 and the third ink layer 1024.

Optionally, main components of the first ink layer 1021 and the third ink layer 1024 both include resin, diluent, toner, and so forth, and main components of the second ink layer 1022 include resin, diluent, titanium dioxide, and so forth.

The second ink layer 1022 may be prepared on the first ink layer 1021 by a printing process. A thickness of the second ink layer 1022 is greater than or equal to 4 mm and less than or equal to 10 mm, so as to prevent the thickness of the second ink layer 1022 from being too thin to prevent the small molecular oil-based organic substance separated from the sealant 103 from diffusing to the surface of the first ink layer 1021, at a same time, while avoiding that the thickness of the second ink layer 1022 is too thick resulting in increased manufacturing cost. Furthermore, the thickness of the second ink layer 1022 is equal to 4 mm, 5 mm, 6 mm, 7 mm, 8 mm, 8 mm, or 10 mm.

Optionally, the second ink layer 1022 may also directly cover the surface of the sealant 103, and the distance between the edge L1 of the sealant 103 and the edge L2 of the second ink layer 1022 is greater than or equal to 0.1 mm.

Figure 3A:
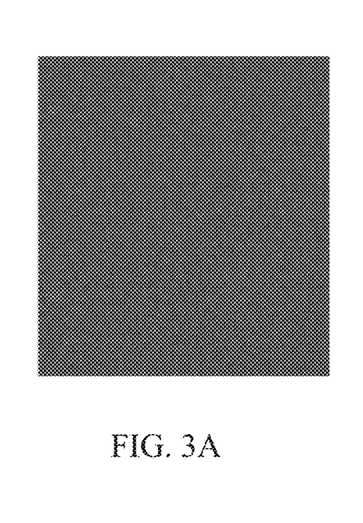
FIG. 3A to FIG. 3B are comparison diagrams of differences in blocking effect of ink type selection on pollution source provided by an embodiment of the present disclosure.
Figure 3B:
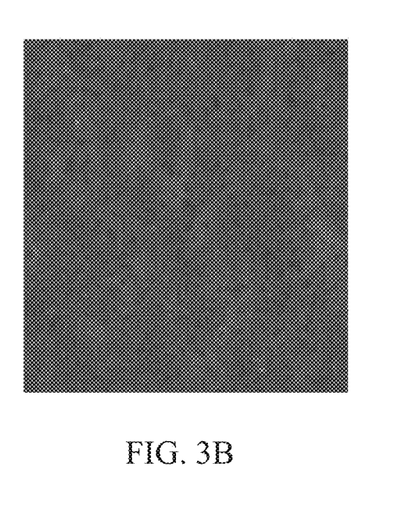

FIG. 3A to FIG. 3B are comparison diagrams of the differences in blocking effect of ink type selection on pollution source provided by an embodiment of the present disclosure. The first ink layer 1021 may be selected from matte black ink, and the second ink layer 1022 may be selected from high-gloss ink. That is, the dyne value of the first ink layer 1021 is less than 32 N/m. The dyne value of the second ink layer 1022 is less than 28 N/m. The interface expansion region ratio Sdr of the second ink layer 1022 is greater than the interface expansion region ratio of the first ink layer 1021 Sdr.

Different high-gloss inks have obvious differences in the blocking effect of pollution source. Therefore, when selecting high-gloss inks, it is required to have a smooth surface after printing and the surface texture is still dense and smooth at more than 800 times of microscopic image observation, as shown in FIG. 3A. FIG. 3B is the surface of the high-gloss ink, and has a rough surface after printing and the surface texture is relatively rough at more than 800 times of microscopic image observation, which may not meet requirements.

Figure 4A:
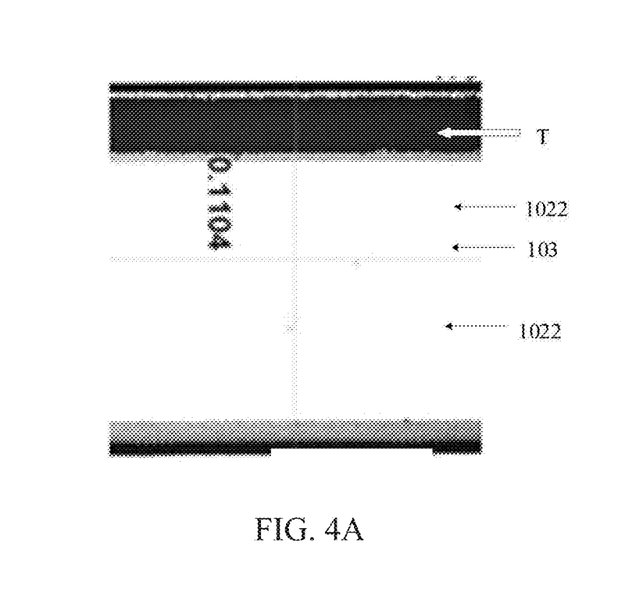
FIG. 4A to FIG. 4C are experimental comparison diagrams provided by an embodiment of the present disclosure.
Figure 4B:
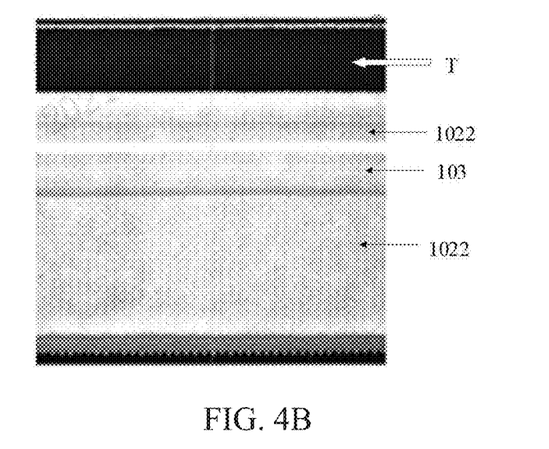
Figure 4C:
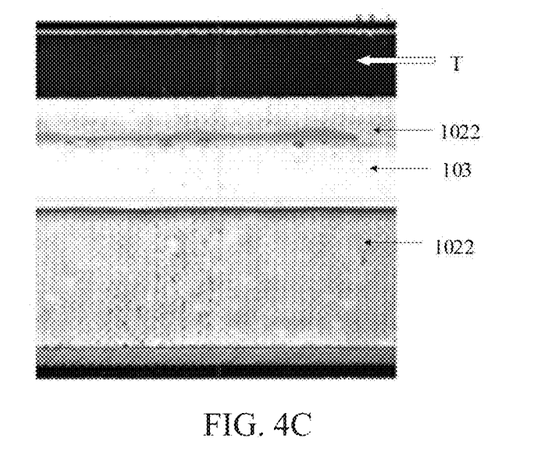

FIG. 4A to FIG. 4C are experimental comparison diagrams provided by an embodiment of the present disclosure. The sealant 103 and the second ink layer 1022 adopt the design shown in FIG. 2B. The inventors of the present disclosure tested and verified that the distances between the edge L1 of the sealant 103 and the edge L2 of the second ink layer 1022 was equal to 0.05 mm (as shown in FIG. 4A), 0.1 mm (as shown in FIG. 4B), and 0.2 mm (as shown in FIG. 4C). Specifically, the sealant 103 firstly is applied to the cover plate 102 as a sample printed with the second ink layer 1022 in a Class 1000 clean room, and a dispensing width of the sealant 103 is 1.0±0.05 mm, and then test handwriting on the surface of the first ink layer 1021 (as shown by T in FIG. 4A to FIG. 4C) is drawn by using a dyne pen, and after 50 days of test verification, it is proved that the distance between the edge L1 of the sealant 103 and the edge L2 of the second ink layer 1022 is equal to 0.05 mm, the dyne handwriting shrinks on the surface of the first ink layer 1021 (the shrinkage distance is 0.1104 mm). An effect that the second ink layer 1022 blocks the small molecular oil-based organic substance separated from the sealant 103 is poor, and the dyne value of the surface of the first ink layer 1021 is reduced. However, in a case that the distance between the edge L1 of the sealant 103 and the edge L2 of the second ink layer 1022 is greater than or equal to 0.1 mm, the second ink layer 1022 may effectively block the small molecular oily substance separated from the sealant 103 from diffusing on the surface of the first ink layer 1021, and after 50 days, the dyne value on the surface of the first ink layer 1021 still meets the design requirements, and the dyne handwriting does not shrink on the surface of the first ink layer 1021.

The present disclosure also provides a display apparatus, wherein the display apparatus any of the above-mentioned display modules.

It is understood that the display apparatus includes a movable display apparatus (such as a notebook computer, a mobile phone, and so on), a fixed terminal (such as a desktop computer, a television, and so on), a measurement device (such as a sports bracelet, a thermometer, and so on), and the like.

Specific examples are applied herein to explain the principles and embodiments of the present disclosure, but the description of the above embodiments is only used to help to understand the methods and the core idea of the present disclosure. At the same time, for those ordinary skilled in the art, there will be changes in the specific embodiments and application scopes based on the ideas of the present disclosure. In conclusion, the content of this description should not be construed as limiting the present disclosure.

What is claimed is:

1. A display module, wherein the display module comprises a display area and a non-display area surrounding the display area, the display module comprising:
   a display panel;
   a cover plate, disposed on the display panel, the cover plate comprises a first ink layer and a second ink layer located in the non-display area, the second ink layer is disposed at one side of the first ink layer close to the display panel, the cover plate further comprises a third ink layer, wherein the third ink layer is disposed at one side of the first ink layer away from the second ink layer; and
   a sealant, located in the non-display area and located between the display panel and the second ink layer;
   wherein an orthographic projection region of the sealant on the display panel is located within an orthographic projection region of the second ink layer on the display panel, and a distance between an edge of the sealant and an edge of the second ink layer is greater than or equal to 0.1 mm,
   wherein an orthographic projection of the second ink layer on the display panel is located within an orthographic projection of the first ink layer on the display panel, and an orthographic projection of the first ink layer on the display panel is located within an orthographic projection of the third ink layer on the display panel, and wherein a distance between an edge of the second ink layer and an edge of the third ink layer is greater than or equal to a distance between an edge of the second ink layer and an edge of the first ink layer.

2. The display module as claimed in claim 1, wherein an interface expansion region ratio of the second ink layer is greater than an interface expansion region ratio of the first ink layer.

3. The display module as claimed in claim 2, wherein the interface expansion region ratio of the second ink layer is greater than 0.1.

4. The display module as claimed in claim 1, wherein a dyne value of the second ink layer is smaller than a dyne value of the first ink layer.

5. The display module as claimed in claim 1, wherein the display panel comprises an array substrate and a color filter substrate disposed at one side of the array substrate close to the cover plate; wherein the sealant is disposed between the array substrate and the second ink layer, and an orthographic projection region of the second ink layer on the array substrate intersects an orthographic projection region of the color filter substrate on the array substrate.

6. The display module as claimed in claim 1, wherein the display module further comprises a backlight module disposed on one side of the display panel away from the cover plate;
   wherein an orthographic projection region of a boundary of the second ink layer away from the display area on the backlight module coincides with a boundary of the backlight module.

7. The display module as claimed in claim 1, wherein the sealant comprises a first sealant and a second sealant arranged at intervals in a first direction; the display panel further comprises a driving chip located within the non-display area and located between the first sealant and the second sealant; the second ink layer comprises a first sub-ink layer and a second sub-ink layer;
   wherein an orthographic projection region of the first sealant on the display panel is located within an orthographic projection region of the first sub-ink layer on the display panel, and a distance between an edge of the first sealant and an edge of the first sub-ink layer is greater than or equal to 0.1 mm; an orthographic projection region of the second sealant on the display panel is located within an orthographic projection region of the second sub-ink layer on the display panel, and a distance between an edge of the second sealant and an edge of the second sub-ink layer is greater than or equal to 0.1 mm.

8. The display module as claimed in claim 1, wherein the non-display area comprises a first non-display area extending in a first direction and a second non-display area extending in a second direction connected to the first non-display area, wherein the first direction intersects the second direction; wherein the sealant is located in the first non-display area, and the second ink layer comprises a main body portion located in the first non-display area and an extension portion disposed in the second non-display area, which is connected to the main body portion, wherein the orthographic projection region of the sealant on the second ink layer is located within a boundary of the main body portion.

9. The display module as claimed in claim 8, wherein a width of the extension portion gradually decreases in a direction away from the first non-display area.

10. The display module as claimed in claim 1, wherein a thickness of the second ink layer is greater than or equal to 4 mm and less than or equal to 10 mm.

11. The display module as claimed in claim 1, wherein the sealant comprises silicone adhesive.

12. The display module as claimed in claim 4, wherein the dyne value of the second ink layer is less than 28 N/m.

13. A display apparatus, comprising a display module, the display module comprising a display area and a non-display area surrounding the display area, the display module comprising:
- a display panel;
- a cover plate, disposed on the display panel, the cover plate comprises a first ink layer and a second ink layer located in the non-display area, the second ink layer is disposed at one side of the first ink layer close to the display panel, the cover plate further comprises a third ink layer, wherein the third ink layer is disposed at one side of the first ink layer away from the second ink layer; and
- a sealant, located in the non-display area and located between the display panel and the second ink layer;
- wherein an orthographic projection region of the sealant on the display panel is located within an orthographic projection region of the second ink layer on the display panel, and a distance between an edge of the sealant and an edge of the second ink layer is greater than or equal to 0.1 mm;
- wherein an orthographic projection of the second ink layer on the display panel is located within an orthographic projection of the first ink layer on the display panel, and an orthographic projection of the first ink layer on the display panel is located within an orthographic projection of the third ink layer on the display panel, and wherein a distance between an edge of the second ink layer and an edge of the third ink layer is greater than or equal to a distance between an edge of the second ink layer and an edge of the first ink layer.

14. The display apparatus as claimed in claim 13, wherein an interface expansion region ratio of the second ink layer is greater than an interface expansion region ratio of the first ink layer.

15. The display apparatus as claimed in claim 14, wherein the interface expansion region ratio of the second ink layer is greater than 0.1.

16. The display apparatus as claimed in claim 13, wherein a dyne value of the second ink layer is smaller than a dyne value of the first ink layer.

17. The display apparatus as claimed in claim 13, wherein the display panel comprises an array substrate and a color filter substrate disposed at one side of the array substrate close to the cover plate; wherein the sealant is disposed between the array substrate and the second ink layer, and an orthographic projection region of the second ink layer on the array substrate intersects an orthographic projection region of the color filter substrate on the array substrate.

18. The display apparatus as claimed in claim 13, wherein the display module further comprises a backlight module disposed on one side of the display panel away from the cover plate;
- wherein an orthographic projection region of a boundary of the second ink layer away from the display area on the backlight module coincides with a boundary of the backlight module.

19. The display apparatus as claimed in claim 13, wherein the sealant comprises a first sealant and a second sealant arranged at intervals in a first direction; the display panel further comprises a driving chip located within the non-display area and located between the first sealant and the second sealant; the second ink layer comprises a first sub-ink layer and a second sub-ink layer;
- wherein an orthographic projection region of the first sealant on the display panel is located within an orthographic projection region of the first sub-ink layer on the display panel, and a distance between an edge of the first sealant and an edge of the first sub-ink layer is greater than or equal to 0.1 mm; an orthographic projection region of the second sealant on the display panel is located within an orthographic projection region of the second sub-ink layer on the display panel, and a distance between an edge of the second sealant and an edge of the second sub-ink layer is greater than or equal to 0.1 mm.

20. The display apparatus as claimed in claim 13, wherein the non-display area comprises a first non-display area extending in a first direction and a second non-display area extending in a second direction connected to the first non-display area, wherein the first direction intersects the second direction; wherein the sealant is located in the first non-display area, and the second ink layer comprises a main body portion located in the first non-display area and an extension portion disposed in the second non-display area, which is connected to the main body portion, wherein the orthographic projection region of the sealant on the second ink layer is located within a boundary of the main body portion.

* * * * *